Feb. 25, 1941. C. C. DI VINCENZO 2,233,273
LONG OBJECT CARRIER MEANS FOR AUTOMOTIVE VEHICLES
Filed Aug. 15, 1938
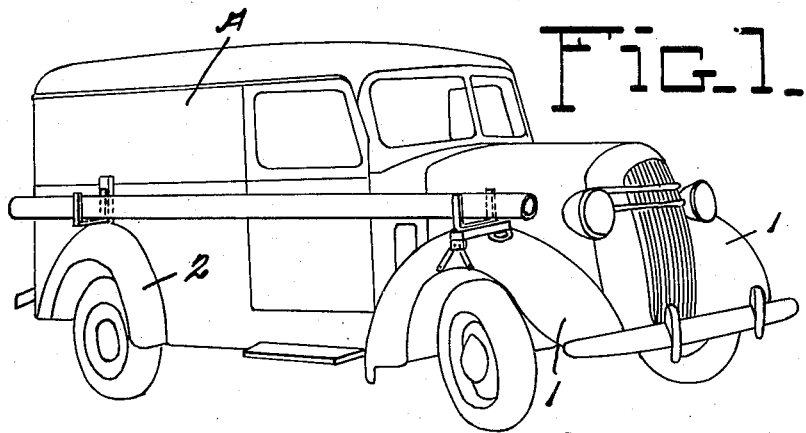
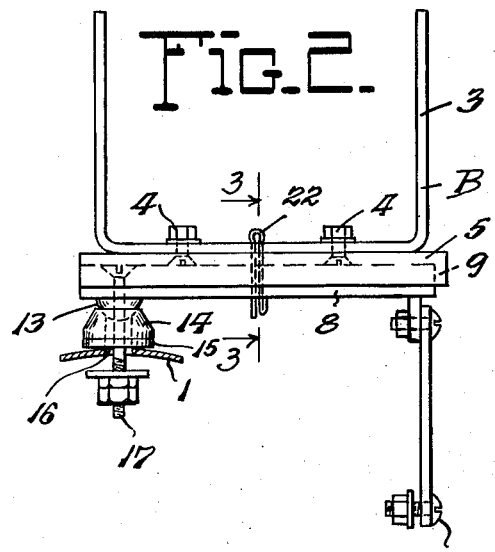
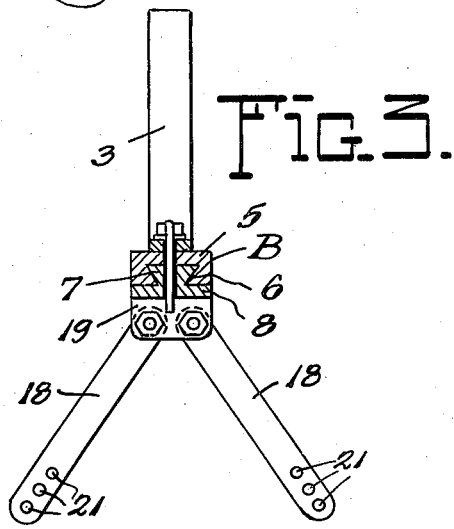
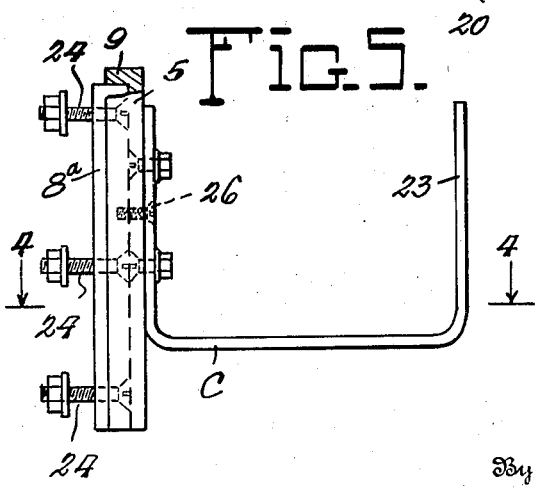
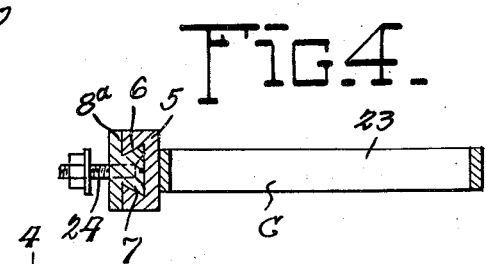
Inventor
CASEY C. DI VINCENZO
By Robert Cobb
ATTORNEYS Patented Feb. 25, 1941

2,233,273

UNITED STATES PATENT OFFICE 2,233,273

LONG OBJECT CARRIER MEANS FOR AUTOMOTIVE VEHICLES

Casey C. Di Vincenzo, Cleveland, Ohio, assignor to Fred F. Berkowitz, Cleveland, Ohio Application August 15, 1938, Serial No. 225,065

2 Claims. (Cl. 224—29)

This invention is a carrying attachment means for automotive vehicles. The purpose of this invention is to provide simple attachment devices adapted to be secured in a detachable manner to the fenders or mudguards at a side of an automobile, truck, or similar vehicle to facilitate the transporting of pipes, poles, or long objects that cannot be readily placed within the body of the vehicle.

The invention is designed especially for use by plumbers, carpenters, or others owning trucks or passenger automobiles who are required from time to time at least to carry on their cars pipes and long pieces of lumber, poles, or the like.

The primary object of the invention has been to so construct the attachment means that the same may be applied to any of the general run of vehicles, such as referred to, which are in use today. To this end the attachment means includes carrying members to be supported on front and rear fenders or mudguards at one side of the vehicle, preferably the side opposite that from which the driver enters the vehicle, and supports for the carrying members which may be quickly secured in place on the vehicle, and which, if desired, may be readily removed, and which are so formed as to enable quick detachable connection therewith and removal of the said carrying members.

A preferred embodiment of the invention is illustrated in the accompanying drawing, in which—

Figure 1 is a perspective view of an automobile of the closed body truck type equipped with the invention and showing long objects supported in place by the carrier members of the attachment means.

Figure 2 is a view taken cross sectionally of the front mudguard or fender of the vehicle, showing the latter in a fragmentary manner and illustrating in rear elevation the front attachment device.

Figure 3 is a vertical sectional view taken about on the line 3—3 of Figure 2, the fender omitted and looking in the direction of the arrows of the section indicia.

Figure 4 is a horizontal sectional view on the line 4—4 of Figure 5, showing the supporting member of the attachment device used for the rear fender.

Figure 5 is a rear elevation of the main parts of the rear attachment device, broken away at the upper portion to illustrate such portion of the detachable carrier plate in section.

Specifically describing the invention, it is noted that similar reference characters refer to similar parts throughout the annexed drawing and description supplied hereinafter.

In the drawing A denotes a conventional type of automotive truck employing a closed body and respecting which there are provided the usual front fenders 1 and rear fenders, one of the latter only being illustrated at 2.

The attachment means of the invention is mounted upon the fenders 1 and 2 and comprises an attachment device designed especially to be applied to a front fender 1 and another somewhat differently constructed attachment device for application to the rear fender 2. The front attachment device is generally designated B in Figures 2 and 3 and the rear attachment device is generally designated C in Figures 4 and 5.

The front attachment device consists of a U-shaped carrier member 3 the lower or base portion of which is attached by suitable screw bolts 4 to a detachable plate 5, the screw heads of the bolts 4 being countersunk in the body of the plate 5 as shown in Figure 2. The plate 5 is constructed so that it is provided with a dovetail shaped longitudinal groove 6, in which groove is received a dovetail shaped interlocking member 7 which projects upwardly from the base plate 8 of the attachment device. The groove 6 is open at its inner end and closed at its outer end by means of a downwardly extending flange portion 9 projecting from the member 5.

The base plate 8 is intended to be secured to the front mudguard in the following manner: At its inner end said plate 8 is formed with a semiglobular ball member 13 adapted to fit a metal socket member 14, the latter arranged to be supported on the front fender 1 with a washer 15 interposed between its bottom and the upper surface of the mudguard to prevent undue marring of the latter. A hole 16 is journaled in the fender or mudguard 1 and a bolt 17 is passed through the base member 8 with its head countersunk in the dovetail portion 7 thereof, through the members 13, 14, 15, and 1, see Figure 2, and tightening and clamp nuts are applied to the lower threaded end of the bolt 17 for the connection of the latter to the member 1 in an obvious manner. At its outer end the base member 8 is secured to the outermost portion of the fender 1 near its edge by arms 18 pivotally connected with a lug 19 on the outer extremity of the member 8. Said arms 18 extend downwardly and may be adjustably secured at their lower ends by suitable bolts 20 to the fender 1. The adjustable connection between the parts 18 and member 1 is afforded by a series of openings 21 in the lower end of each member 18. The purpose of this adjustable connection is to enable the member 8 to be arranged in a substantially horizontal position and applied to different contours of fenders 1, in a manner which will be readily apparent.

When the detachable plate 5 is slid inwardly on the member 8 with the groove 6 receiving the dovetail portion 7, said member 5 is prevented from displacement by a lock pin 22 which may be a cotterpin or any equivalent member, passing through registered apertures in members 3, 5 and 8. It will be apparent, however, that by removal of the member 22 and grasping of one of the sides of the carrier member 3, the parts 3 and 5 may be bodily displaced from the base member 8 when the carrier means of the invention is not desired to be used. Obviously, it is not very sightly to employ the carrier members of the invention when there is no utility for same, as when the truck is not being employed for transporting pipes, poles, or long objects.

The rear carrier member 23 is like the front carrier member 3 so far as the U-form is concerned, but is mounted upon a vertical detachable plate like the plate 5, the lug or abutment 9 being uppermost, however. The plate 5 works on a vertical base plate 8a like that previously described and the plate 8a is fastened to a side of the body of the vehicle A by suitable screw bolts 24 like the bolts 17. The plate 5 is prevented from displacement from the base plate 8a by a screw 26 that functions similarly to the pin 22 described in reference to the construction of Figures 1 and 2, the screw passing through registered openings in the members 23 and 5, with its inner end threadedly received in a threaded opening in the base member 8a.

From the foregoing it will be seen that the member 5 of the rear carrier device may be removed in a manner similar to the method of removal of the member 5 of the front carrier device. The only difference is that in the latter the removal is effected by horizontal movement and in the former the removal is effected by vertical movement. In each instance the fastening means 22, or 26 as the case may be, is first removed to enable the particular carrier member to be detached. The attachment and removal of the carrier members 3 and 23 of the front and rear carrier devices respectively may be effected with equal facility.

Should it be desired under some conditions, tie means may be employed intermediate the sides of each carrier member 3 and 23 if there is any liability of the long objects supported thereby being displaced in the travel of the automotive vehicle upon which the invention is used.

If desired, a plurality of the rear carrier devices described and shown in Figures 4 and 5, as distinguished from a single one of the carrier devices used in the front of the vehicle and shown in Figures 2 and 3, may be employed within the purview of the invention.

Having thus described my invention, what I claim as new and desire to secure by Letters Patent of the United States, is:

1. Long object carrier means for automotive vehicles comprising, in combination, an automotive body having a front fender, a front carrier device mounted thereon and consisting of a carrier member to receive a long object near one end, a base plate disposed above the fender, connecting means between the inner end of the base plate and the fender, supporting arms at the outer end of said base plate extending downwardly therefrom and having detachable connection with the outermost portion of the fender, a slidably mounted detachable plate secured to and having parts interengageable with parts of said base plate and connected with the carrier member, interlocking means between said detachable plate and the base plate to prevent unauthorized sliding displacement of the detachable plate and its carrier member from the base plate, and a carrier device supported by the body of the vehicle to cooperate with the carrier member aforesaid, the connecting means between the front fender and the base plate including ball and socket parts carried by the respective base plate and the fender parts.

2. A carrier device for automotive use comprising a U-shaped carrier member, a base plate for supporting the member, a detachable plate secured to the carrier member, a dove-tail groove and tongue connection between the base plate and detachable plate, and a locking member passing through the carrier member, base plate, and detachable plate to prevent unauthorized displacement of the carrier member and its detachable plate from the base plate, the base plate being formed with a semi-globular ball member, a socket member in which said ball member fits, fastening means to attach the base plate to a fender and passing through the base plate, ball member and socket member, and a pair of arms pivotally connected to the base plate in spaced relation to the said ball member and socket member for the purpose described.

CASEY C. DI VINCENZO.